United States Patent [19]

Baker et al.

[11] 4,006,459

[45] * Feb. 1, 1977

[54] METHOD AND APPARATUS FOR CONTROLLING THE PASSAGE OF PERSONS AND OBJECTS BETWEEN TWO AREAS

[75] Inventors: Richard H. Baker; Richard C. Hix, both of Los Altos, Calif.

[73] Assignee: Mardix, Inc., Mountain View, Calif.

[ * ] Notice: The portion of the term of this patent subsequent to Feb. 16, 1988, has been disclaimed.

[22] Filed: May 25, 1973

[21] Appl. No.: 364,011

Related U.S. Application Data

[60] Continuation of Ser. No. 94,229, Dec. 2, 1970, Division of Ser. No. 523,499, Jan. 17, 1966, Pat. No. 3,564,132.

[52] U.S. Cl. ........................ 340/149 A; 340/149 R; 340/274 C

[51] Int. Cl.$^2$ .......................................... G06K 3/00

[58] Field of Search ....... 340/149 A, 274 C, 149 R; 178/DIG. 1, 6.8, 7.92

[56] References Cited

UNITED STATES PATENTS

| | | | |
|---|---|---|---|
| 2,914,746 | 11/1959 | James | 340/149 A |
| 3,564,132 | 2/1971 | Baker | 340/149 A |

*Primary Examiner*—Harold I. Pitts

*Attorney, Agent, or Firm*—Lowhurst & Aine

[57] ABSTRACT

A security method for controlling the passage of persons and objects between two areas, this method employs a controlled space. Prior to admitting, during the presence and subsequent to exiting of a person to this space, the contents of the space are monitored and examined.

8 Claims, 4 Drawing Figures

INVENTORS
RICHARD H. BAKER
RICHARD C. HIX

BY

ATTORNEY

INVENTORS
RICHARD H. BAKER
RICHARD C. HIX
BY
ATTORNEY

INVENTORS
RICHARD H. BAKER
RICHARD C. HIX
BY
Harvey J.
ATTORNEY

METHOD AND APPARATUS FOR CONTROLLING THE PASSAGE OF PERSONS AND OBJECTS BETWEEN TWO AREAS

This is a continuation of application Ser. No. 94,229, filed Dec. 2, 1970, a division of Ser. No. 523,499, 1/17/66, Patent No. 3,564,132.

This invention relates in general to security systems, and relates more particularly to such systems for controlling the passage of persons and objects between two areas.

There is considerable interest in and demand for security systems to control the ingress and egress of persons and objects in many installations. The need for such systems is most obvious in connection with installations having government security requirements, such as military, atomic energy and intelligence facilities, but many non-government facilities desire such systems to maintain control over employees and visitors and the objects which they bring into or take out of the facility. Traditionally, such systems involved the use of one or more human guards located at openings in an otherwise enclosed area. The guards screened arriving and departing persons in any one of a number of ways, such as recognition by sight, badges, identification cards, etc., and often performed at least a cursory visual examination of departing employees to detect any misappropriation of company property. However, the use of human guards in this fashion has the distinct disadvantage of being quite expensive in terms of salaries, benefits, etc., particularly where there are a number of openings which must be simultaneously manned, many on a twenty-four hour basis. Additionally, human guards are sometimes subject to lapses of fallibility and will permit unauthorized persons or objects to pass the guard station.

Recently, a number of automatic or semi-automatic security systems have been suggested in pictorial literature and spy type motion pictures which purport to reduce or eliminate the problems involved in human control of the screening of persons and objects. Such systems suggest a number of different techniques, such as the use of a video pickup to transmit a picture of the person seeking ingress or egress to a central control where a decision is made, usually based on recognition of the person by a guard at the central control, and sometimes requiring conversations with the person.

However, none of these suggested systems disclose a satisfactory system or the means necessary to provide reliable control over the passage of persons and objects between two areas. In accordance with the present invention, there is provided methods and apparatus for security control which employ a space having a first door which communicates with one area from which persons and objects arrive seeking admission, and a second door communicating with another area, the doors and the space, of course, being the only path between the two areas. Each of the doors is provided with means for indicating the open or closed condition thereof, and means for locking and unlocking the door. The space itself is provided with sensing means for sensing or determining the presence of objects or humans therein, as well as means for examining the identity of a person therein.

Prior to use of the space, both doors are locked. A person seeking to pass through the space from one area to the other initiates a request at the appropriate door and, assuming that the space is not then in use, that door is unlocked if the other door is locked. As the person opens the unlocked door to enter, the space sensing means is preferably energized to monitor the contents of the space from that point on in the examination. After the person enters the space and closes the door behind him, that door is locked, and the identity sensing means is energized to examine the identity of the person. If the identity examination indicates that the person is suitable for passage to the other area, and if the space sensing means indicates that there are no unauthorized articles or persons in the space, such as unauthorized objects or another person in addition to the one examined, the other door is unlocked to permit the examined person to pass into the other area.

When the departing person closes the door, it is locked and the space sensing means again examines the space for the presence of any objects or persons. Such a person might be one who entered the space while the door was open for the examined person's departure, and such an object might be one which the departing person deposited therein. This is an important feature of our invention, since it prevents a person in the space from leaving behind, either intentionally or unintentionally, some object which could be picked up by a person subsequently entering the space. If the space sensing means does detect an object or person remaining in the space, the system is preferably prevented from conducting any further examination until suitable corrective action has been taken. If the space sensing means does not detect any object or person remaining in the space, the system is ready for the next person arriving at either door seeking passage through the space.

In one form of the present invention, the space sensing means includes a first video pickup disposed in the space so as to provide at a remote control console an overhead view of the space. This overhead view facilitates the detection of unauthorized objects or persons in the space compared with a conventional system which would provide a view from the side of the space. The overhead view is particularly effective in detecting irregularities such as objects or persons disposed on the floor of the space, or a person hiding behind the person being examined in the space. The identity examining means includes the above described video pickup and a second pickup which is positioned to scan a photograph on an identification card presented by the person being examined. Through a unique optical system, the first video pickup is switched during the identity examining procedure from the overhead view it provided during the space sensing operation to a view of the face of the person presenting the identification card. The video pictures of the photograph on the card and the face of the card bearer are transmitted and displayed simultaneously at the control console for comparison. If the pictures correspond, the person's identity is satisfactorily established and he is allowed to proceed. If the pictures do not correspond, suitable action is taken, such as permitting the person to leave the space through the door by which he entered, or keeping the person locked in the space to detain him for further examination or other action.

It is therefore an object of this invention to provide a security system for controlling the passage of persons and objects through a closed space from one area to another, in which the space is examined prior to the admission of a person thereto to detect the presence of unauthorized objects or persons therein, and after admission of a person to the space, the space is sealed off and the person examined as to identity.

It is a further object of this invention to provide a method for controlling the passage of persons and objects through a closed space between one area and another, which involves examining the space for unauthorized objects or persons prior to admitting a person thereto, admitting the person, sealing off the person in the space, examining the person in the space as to identity, and permitting the person to pass through the space if his identity is satisfactorily established by the examination.

It is an additional object of the present invention to provide a method for controlling the passage of persons and objects through a closed space between one area and another, which involves the steps of examining the space for unauthorized objects or persons prior to admitting a person to the space, admitting the person, locking the person in the space, examining the person in the space as to his identity, permitting the person to pass through the space if his identity is satisfactorily established by the examination, locking the space after the departure of the examined person, and again examining the space for unauthorized objects or persons.

It is an additional object of this invention to provide a security system employing a first video pickup to transmit a picture of the interior of an examining space to detect unauthorized objects or persons therein, and employing a second video pickup to transmit a picture of a photograph on an identification card presented by a person being examined in the space while the first pickup is transmitting a picture of the face of the person presenting the card, a comparison of the transmitted pictures resulting in a decision as to the suitability of the person to proceed through the space.

It is a further object of this invention to provide an improved security system for controlling the passage of persons and objects between one area and another, which system employs an enclosable space between the areas which can be examined as to contents before, during and after the passage of a person therethrough and in which the identity of the person can be examined.

Further objects and advantages of the present invention will become apparent to those skilled in the art to which the invention pertains as the ensuing description proceeds.

The features of novelty that are considered characteristic of this invention are set forth with particularity in the appended claims. The operation of the invention itself will best be understood from the following description when read in connection with the accompanying drawings, in which:

Figure 1:
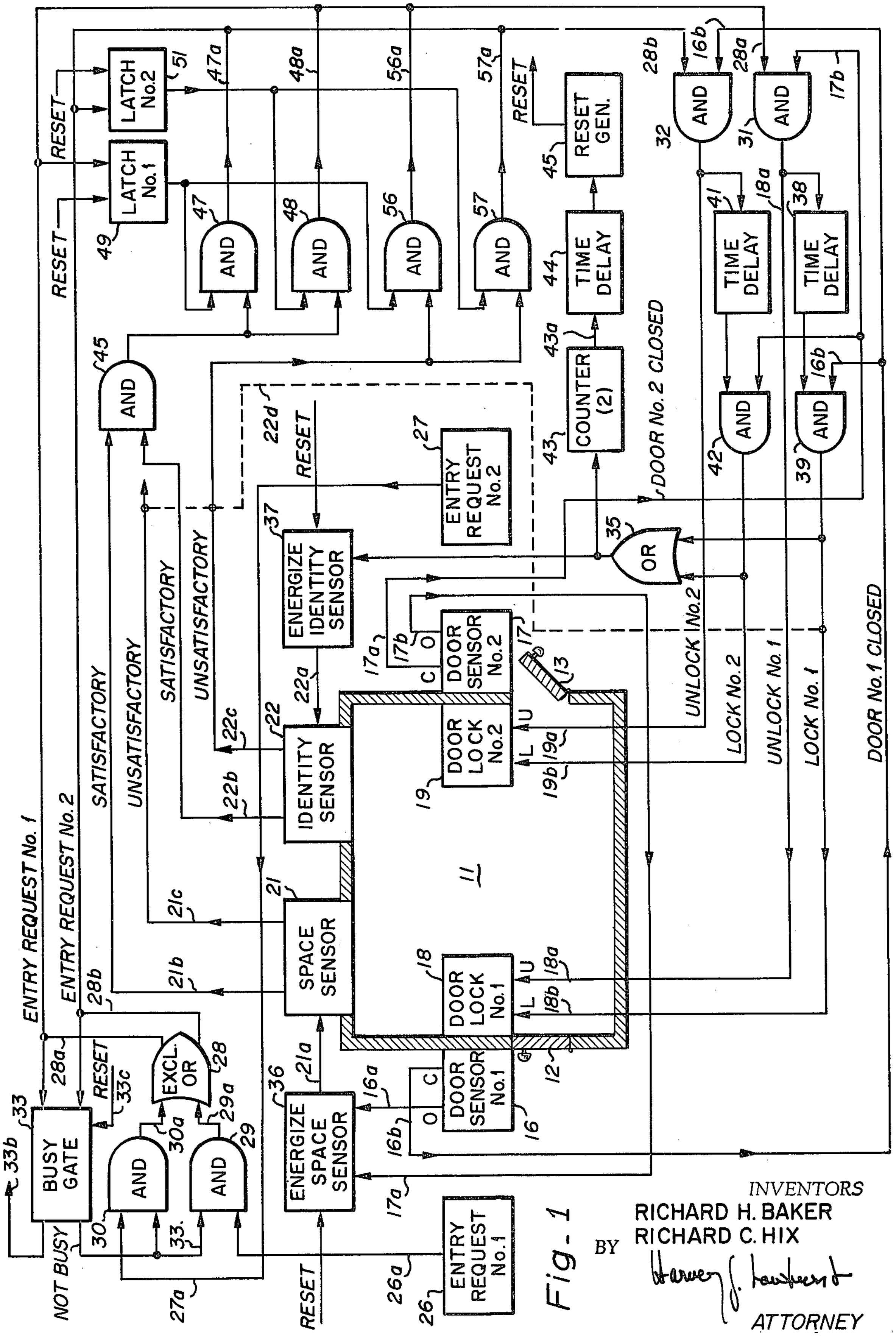
FIG. 1 is a schematic diagram of one embodiment of the present invention which is essentially fully automatic.

Referring to FIG. 1, a security system according to this invention is shown which is essentially fully automatic. Reference character 11 designates the enclosable space through which persons and objects must pass in going from one area to another. Space 11 may be, for example, a booth having doors 12 and 13 on opposite sides thereof leading to the areas which are to be controlled, with space 11 being the only path between the two areas. Each of doors 12 and 13 is provided with means for sensing and indicating the open or closed condition of the door, as well as means for locking and unlocking the doors. Such means are shown schematically as a door sensor 16 associated with door 12 and having one output line **16*a* indicating that the door is open and another output line 16*b* indicating that the door is closed. Similarly, door 13 has a door sensor 17 having an output line 17*a* indicating that the door is open and a line 17*b*** indicating that the door is closed.

The door locking and unlocking means is shown schematically as a door lock means 18 for door 12 having one input line **18*a* which, when energized, unlocks door 12, and another input line 18*b* whose energization results in locking of door 12. Similarly, a door lock 19 is provided for door 13 which has an unlocking input line 19*a* and a locking input line 19*b*. Door locks 18 and 19** may be any suitable well-known type which can be controlled to lock and unlock the associated doors upon energization of the appropriate input lines.

Space 11 is also provided with space sensing means, shown schematically at 21, for detecting the presence of objects and persons within the booth. Sensing means may be constructed to sense the number of objects (including persons) occupying the booth or the absence thereof. Sensing means 21 has an input energizing line **21*a* and a pair of output lines 21*b* and 21*c*. Output line 21*b* is energized when the sensing means 21 indicates that the booth is properly occupied, such as for example by a single person, and line 21*c* is energized when the sensing means detects that the booth is improperly occupied, such as for example by more than one person, or a person and an object. In any case, sensing means 21 is programmed in accordance with a selected set of conditions to indicate whether the selected set of conditions is met or is not met. Sensing means 21 may be any suitable type of means capable of monitoring the contents of space 11. One example of such sensing means would be a video pickup which transmits an image of the interior of the booth to a control monitor. Another example is a thermal energy detector capable of detecting heat or moisture from persons in space 11 and providing output indications according to the energy detected. Other sensing means might utilize the measurement of the absorption of acoustic or electromagnetic energy by persons or objects in the space 11** to provide an indication of its contents.

Where a video pickup is employed as the sensing means in space 11, the signal therefrom is transmitted to a central control for examination by a human operator, who will take some action in accordance with the nature of the information received and actuate either line **21*b* or line 21*c* depending on whether visual inspection shows that the selected set of conditions is met or is not met. However, it is possible to have a fully automatic system which does not require human intervention where other types of sensing means are employed that are capable of generating the proper control signals in dependence upon the objects or persons detected in space 11.**

Space 11 is also provided with an identity examining means, shown schematically at 22, for examining the identity of the person in the space and determining his suitability to enter the area to which he is seeking access. Such identity examining means may be of any suitable type, such as a video pickup for simultaneously transmitting pictures of the face of the person in the space and the photograph on an identification card which that person is carrying. In this situation, the pictures would be transmitted to the central control for examination by a human operator, and if the pictures corresponded (and if the person was otherwise suitable), the operator would take the appropriate action to allow the person to proceed.

Other identity examining techniques may be employed, such as matching the persons' fingerprints against a master file of fingerprints of authorized people, or matching the persons' voice, by means of voice recognition equipment, against a master file of voices of authorized people. Again, these latter two techniques would be capable of fully automatic operation without human intervention.

Identity examining means 22 is provided with an energizing input line **22*a*, an output line 22*b*** indicating that the identity of the examined person is not satisfactory. In this connection, it will be noted that it is not necessary to the operation of this system that the person be examined positively; it is sufficient if information is provided as to the suitability or non-suitability of the person.

The operation of the remainder of the system of FIG. 1 can best be understood by considering its action in a typical situation. Assume that a person approaches door 12 and desires to pass through space 11 and door 13 to the other area. The person would initiate an entry request through an entry request device 26 which is located adjacent door 12 and which may be a push-button switch which produces an output on a line **26*a* when actuated. A similar entry request device 27 is located adjacent door 13 and has an output line 27*a*. The signals on lines 26*a*, 27*a* are supplied as inputs to respective AND gates 29, 30 which also receive inputs from a "busy" gate 33. Gate 33 has a "not busy" output line 33*a* which indicates that the system is not busy examining another person and which is supplied as an input to gates 29, 30. Gate 33 also has a "busy" output line 33*b*** which may be utilized to provide an indication to the person requesting entry that the system is in use, and which may also be supplied to a central control station to indicate that that particular booth is in use.

For tie-breaking purposes, to prevent simultaneous system response to simultaneous actuation of both entry request devices, output lines **29*a*, 30*a* of gates 29, 30 pass through a network 28 designated as an exclusive OR gate which permits only one signal to pass therethrough at a time. Output lines 28*a*, 28*b* of gate 28 are supplied as inputs to busy gate 33, and the presence of a signal on either of these lines is effective to raise the "busy" line 33*b* and de-energize the "not busy" line 33*a*. Gate 33 is also supplied with a reset line 33*c*** which is energized at the end of the examining procedure in a manner to be described below, to reset the gate to the "not busy" condition.

The output lines **28*a*, 28*b* from network 28 are also connected to the respective inputs of AND gates 31 and 32. AND gate 31 receives another input from the "door closed" line 17*b* of door sensor 17 associated with door 13. Thus, if door 13 is closed, the output on line 17*b*, coupled with the entry request signal on line 28*a*, actuates gate 31 to energize the unlocking line 18*a* of door lock 18 on door 12. Door 12 is thereupon unlocked and the person seeking admission presumably opens the door. When door 12 is opened, the signal produced on the "door open" line 16*a* of door sensor 16 is supplied to means 36 for energizing space sensor 21. The other input to means 36 is supplied from the "door open" line 17*a* of door sensor 17. Space sensor 21 is thus energized upon opening of either of doors 12, 13 to monitor the contents of space 11** from that time forward in the examination procedure. This is an important feature of the present invention, since it assures monitoring of the space contents during the interval between the door opening and the initiation of the identity examining procedure, and would detect such irregularities as more than one person entering the space or the insertion of unauthorized objects into the space.

The output of AND gate 31, which energized the door unlocking line **18*a*, also passes through a time delay device 38 to an AND gate 39. The other input to gate 39 is supplied from the "door closed" line 16*b* of door sensor 16. A similar time delay device 41 and AND gate 42 are provided for door 13, gate 42 receiving its other input from "door closed" line 17*b* of door sensor 17. The time delay of delay devices 38, 41 is selected to allow the person sufficient time to open the door after it was unlocked, enter the space and close the door behind him. Assuming that this has occurred, as evidenced by a signal on "door closed" line 16*b*, gate 39 is energized to supply a signal on line 18*b* to door lock 18 to lock door 12. The door locking signals produced by gates 31, 32 are also supplied through an OR gate 35 to means 37 for energizing the identity sensing means 22. Identity sensing means is thus energized upon the locking of either door 12, 13. The door locking signals are also supplied from OR gate 35 to a counter 43 which produces an output signal on a line 43*a* after two door locking signals have been received. This output is supplied through a time delay device 44 to a reset generator 45** which produces a resetting signal, in a manner to be described below.

At this point, both doors to the space are locked and the person initiating the entry request is presumably in the space awaiting the identity examination. If such is the case, the identity examination begins, either by video transmission of the face of the person and the photograph on his identification card, or the matching of his fingerprints or voice against those in a master file as discussed above, or in any other appropriate manner which will establish the suitability of that person to proceed. Identity sensor 22 is preferably of the type which produces an output signal upon completion of the identity examination, indicating either that the identity is satisfactory (line **22*b*) or that it is unsatisfactory (line 22*c***).

If the identity is satisfactory, the resulting signal on line **22*b* is supplied as one input to an AND gate 45. Gate also receives an input from the "satisfactory" line 21*b* of space sensor 21. The output from space sensor 21 is preferably a continuous one which continuously indicates the satisfactory or unsatisfactory condition of the contents of space 11. That is, if an unauthorized person or object is present in space 11, the unsatisfactory line 21*c*** would be energized as long as this condition prevailed; when the condition was removed, such as by removal of the unauthorized object or departure of the unauthorized person, line 21*c* would be de-energized and "satisfactory" line 21*b* would be energized.

Assuming the space sensor output indicates a satisfactory condition, if identity sensor 22 produces a satisfactory output on line 22*b*, gate 45 is energized to produce an output signal which is supplied as one input to a pair of AND gates 47, 48. The other inputs to gates 47, 48 are supplied from a pair of latches 49, 51 which form a memory circuit for remembering which door initiated the entry request. Latch 49 is connected to entry request line 28*b* and is latched up in response to a signal on that line. Once latched, the latches remain in that condition until reset by their respective reset lines.

In the example operation under discussion, the initial entry request at door 12 will have latched up latch 49 to provide one input to gate 47. Thus, when the "satisfactory" signal from gate 45 is supplied to gate 47, this latter gate is energized to supply a signal over its output line 47*a* to the one input of unlocking gate 32. The other input to gate 32 is supplied from the "door closed" line 16*b* for door 12, and assuming that this door is closed, gate 32 is energized to supply a signal on line 19*a* to unlock door 13. This permits the person in the space to open door 13 and enter that area, his identity having been satisfactorily established. After the time delay of device 41, and if the departing person has closed door 13, gate 42 is energized to lock door 13 through line 19*b*.

This locking causes counter 43 to produce an output signal on line 43*a*, and this signal passes through time delay device 44. The delay of device 44 is selected to permit space sensor 21 sufficient time to examine space 11 to detect the presence of any unauthorized objects or persons. Since the examined person has presumably left space 11 through door 13, there should be no object or person in the space at this time, and sensor 21 examines the space to determine that this condition in fact prevails.

If the person examined has actually left space 11, and has not permitted another person to enter the space through door 13 while he was departing, and has not left any material in the space, space sensor produces a "satisfactory" output on line 21*b*. After the delay of device 44 expires, the output signal from reset generator 45 is supplied as a resetting pulse to busy gate 33, to latches 49, 51, to energize network 37 for identity sensor 22 and to energize network 36 for space sensor 21. Identity sensor 22 and space sensor 21 are thus de-energized and the system is returned to the condition to await another entry request.

This completes what might be termed a normal procedure, with an authorized person entering space 11 with no unauthorized objects with him, having his identity established as satisfactory by identity sensing means 22, and then leaving space 11 to enter the other area, properly closing each door behind him. It will be appreciated that there will be some situations in which either the identity of the person is not satisfactorily established or space sensor 21 indicates the presence in space 11 of unauthorized objects or persons. Under these circumstances, there are a large number of different control actions which can be performed in response to other than normal conditions. For example, in the case of unsatisfactory identification by identity sensor 22, the simplest control action would be to unlock the door by which the person entered the booth, permitting the person to return to the area from whence he came but not allowing him access to the other area.

The system shown in FIG. 1 has the capability to provide this action in response to the appearance of a signal on the "unsatifactory" output line 22c of identity sensor 22. The signal on this line is supplied as an input to two AND gates 56 and 57, and each of these gates receives another input from latches 49, 51 associated with the entry request devices 26, 27. Assume in the example above that the person entering space 11 through door 12 had not satisfactorily established his identity and identity sensor 22 produces an output on "unsatisfactory" line 22*c*. This signal is supplied to gates 56, 57 and since gate 56 has another input thereon from the latch 49 which was set in response to the person's entry request, gate 56 is energized to produce an output on line 56*a*.

This signal is supplied to the input of gate 31 which controls the unlocking of door 12, and assuming that the other input is present at gate 31 indicating that door 13 is closed, gate 31 is energized to unlock door 12 over line 18*b*. This permits the person in space 11 to open door 12 and return to the area from which he came. This unlocking may be accompanied by an audio message or the like informing the person that his identity has not been satisfactorily established and advising him to leave the booth by the door he entered and proceed to another area for further efforts at identification or other procedures.

After the time delay of device 38, door 12 is locked again through a signal on line 18*b*. Space sensor continues to monitor the contents of space 11 to detect any unauthorized objects or persons, such as an object left behind by the person whose identity was not satisfactorily established, or a person who entered space 11 when door 12 was unlocked to permit the examined person's departure, or the failure of the examined person to leave the space.

Assuming that no such unauthorized object or person is detected, after the delay of device 44 has elapsed, space sensor 21 is de-energized, latches 49, 51 are reset, and gate 33 is reset to provide a "not busy" signal, thus readying the system for another person to be examined.

In some instances it may be desirable to take some action in response to an unsatisfactory identification other than permitting the person to return through the door by which he entered space 11. For example, it may be desirable to detain the person for further investigation. This type of action can be provided by locking both doors 12, 13 in response to an unsatisfactory identification, as indicated by the dotted line 22*d* which is connected from line 22*c* to the locking inputs 18*b*, 19*b* of door locks 18, 19. This action would detain the person in space 11 until he could be removed for questioning or other action.

The "unsatisfactory" output line of space sensor 21 may also be connected to line 22*d* to provide this locking action if desired under certain circumstances, such as the detection of another person in the booth in addition to the one whose identity is being examined, or the detection of some types of unauthorized objects in the booth. Additionally, suitable alarm means may be energized by either or both of the "unsatisfactory" output lines of sensors 21, 22 to provide an alarm signal which may be employed as a supplement to the other control or corrective actions.

Figure 2:
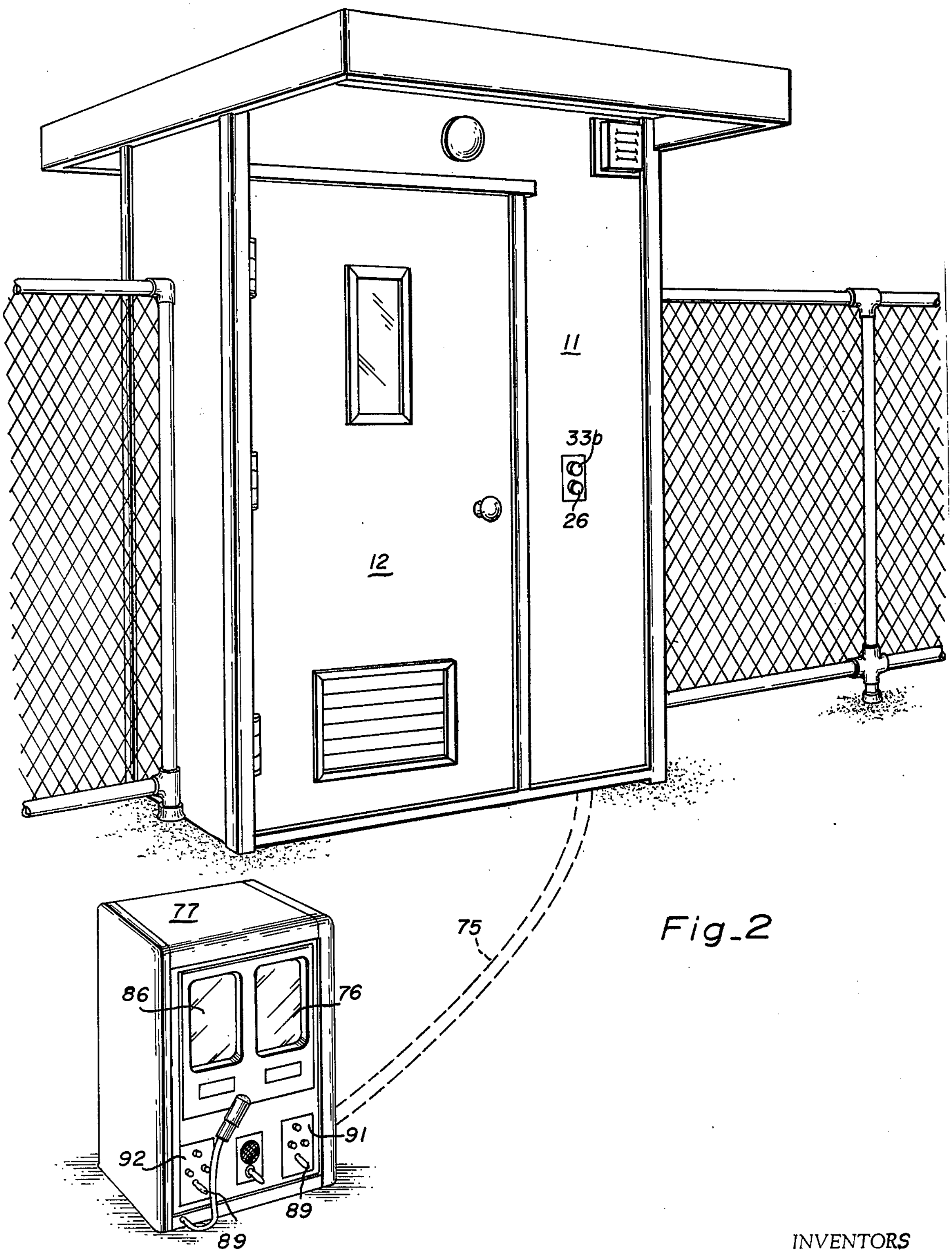
FIG. 2 is a perspective view of a booth forming the examining space in one embodiment of the present invention, together with a control and indicating unit used in connection with one or more of these booths.
Figure 3:
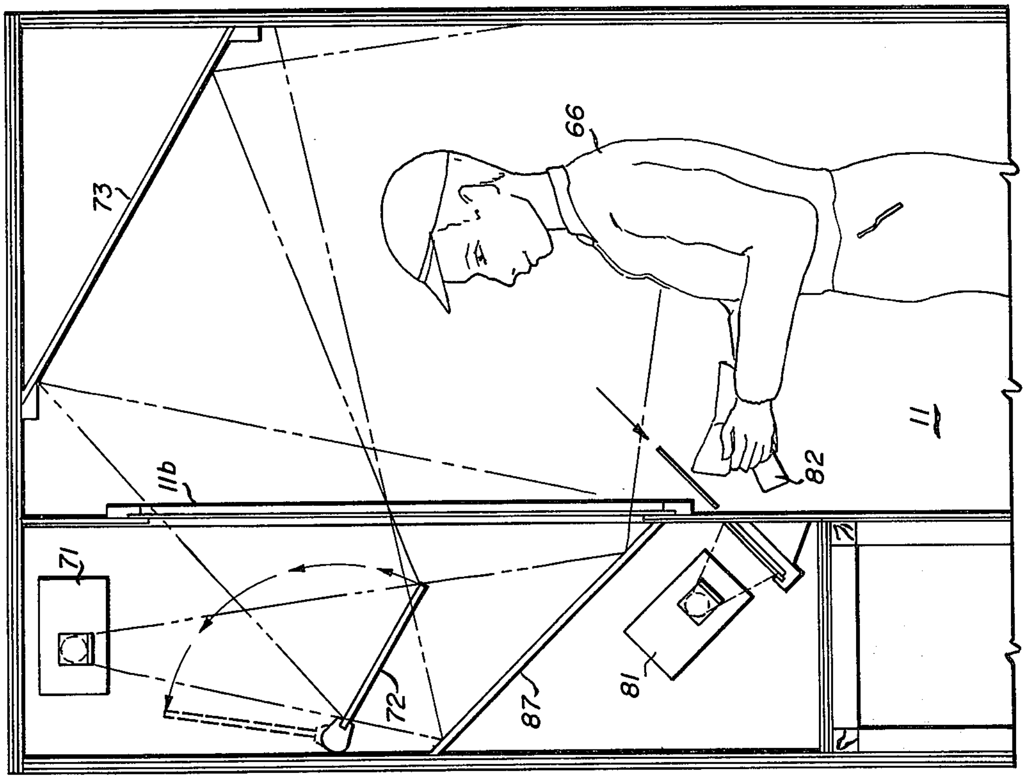
FIG. 3 is a side view of the booth of FIG. 2 showing one embodiment of the space sensing and identity examining means.
Figure 4:
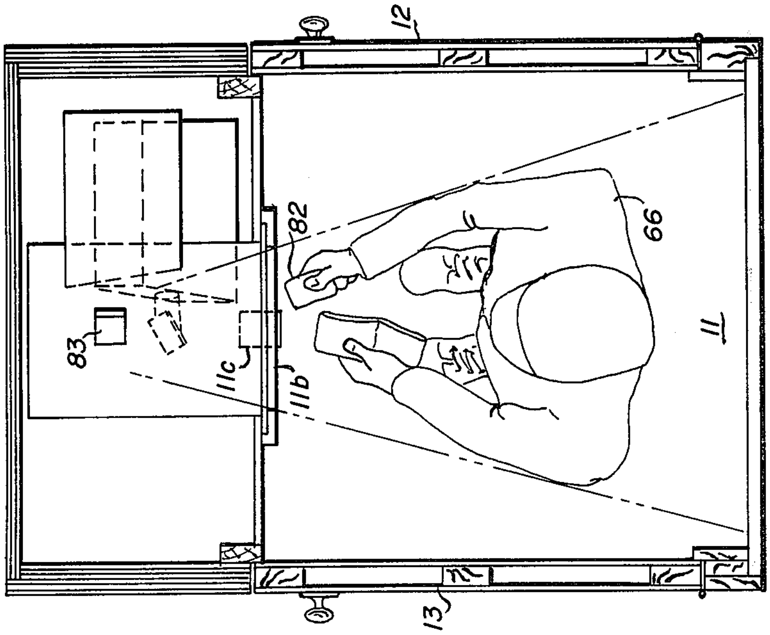
FIG. 4 is an overhead view of the booth of FIG. 2, showing further details of the space sensing and identity examining means.

Referring now to FIGS. 2, 3 and 4, in which like reference characters are used to designate like parts, there is shown a booth 11 which forms the examining space for controlling the passage of persons and objects between two areas. Booth 11 is surrounded by fencing as shown so as to be the only passage between the areas on either side of the fencing, and may be one of a number of similar booths in a complete installation.

Booth 11 is provided with doors 12, 13 which provide access, and is also provided with entry request devices, such as the push-button 26*a* mounted adjacent door 12 as shown in FIG. 2. A "busy" indicator 33*b* may also be provided adjacent button 26*a* to indicate to a prospective entrant that the booth is in use.

Booth 11 employs a video pickup device 71 as part of the space sensor 21, and this pickup is mounted in the booth so as to permit maximum examination of the booth contents for the presence of unauthorized objects or persons. As best shown in FIG. 3, pickup 71 is mounted adjacent the ceiling of booth 11 and is separated from the person 66 to be examined by a transparent partition 11*b*.

The optical path for pickup 71 includes a first mirror 72 which is movable between two positions. In the position shown in solid lines in FIG. 3, mirror 72 reflects light into pickup 71 from a second mirror 73 mounted near the top of booth 11. Mirror 73 is preferably of a size which will provide a view of the entire booth area, as shown. Pickup 71 thus effectively sees the entire booth from an overhead view as shown in FIG. 3. This greatly facilitates examination of the booth's contents to detect unauthorized objects and persons therein, such as a person crouching in the booth or a person hiding behind the person 66 being examined.

The video signal from pickup 71 is transmitted by suitable means, such as cabling 75 (FIG. 2) to a cathode ray tube 76 for display. Tube 76 may be part of a control and monitoring console 77 disposed at a central control location. In this situation, tube 76 is monitored by a human operator and certain control actions taken in response to the information presented on the screen of the tube.

Booth 11 is also provided with identity examining means which may include a second video pickup 81 mounted behind partition 11*b*. In the embodiment shown, it is assumed that each person to be examined is carrying an identification card 82 which bears a photograph of the card owner. Pickup 81 transmits a picture of this photograph for comparison with the face of the person presenting the card. Card 82 is inserted in a slot 11*c* (FIG. 3) which properly positions the card for scanning by pickup 81 through a mirror 83. The signal from pickup 81 is transmitted through cabling 75 to a second cathode ray tube 86 mounted in console 77.

Simultaneously with this transmission and display of the photograph on card 82, a picture of the face of the card bearer 66 is presented on tube 76 from pickup 71. For this operation, mirror 72 swings up out of the path of pickup 71 to the position shown in dotted lines in FIG. 3. A mirror 87 is positioned as shown to reflect the face of card bearer 66 into pickup 71. The pictures of the photograph on card 82 and the face of its bearer are thus simultaneously displayed on a side by side basis on the faces of tubes 76, 86 of console 77. By suitable choice of the optics involved, the two pictures on tubes 86, 76 can be on approximately the same scale to facilitate their comparison for identity.

Console 77, in addition to tubes 76, 86 may also be provided with switches 88, 89 for controlling the locking and unlocking of doors 12, 13, respectively. Switches 88, 89 are interlocked so as to prevent unlocking of one door unless the other door is locked, as has been described above in connection with the description of FIG. 1. Console 77 is also provided with indicator lights 91, 92 which are connected to the door sensors (not shown) to provide an indication of the open or closed condition of each of doors 12, 13. Console 77 may also have indicator lights 94, 95 indicating the presence of entry requests at the different doors of booth 11. A microphone 93 may also be provided for transmission of audio messages to booth 11 for interrogation or the like.

In the operation of the system shown in FIGS. 2–4, both doors of booth 11 are locked when not in use. A person arriving at a door seeking entrance pushes the entry request button, and if the booth is not already in use, this action lights an indicator light 94 or 95 on the console 77 at the control station. The console operator, in response to this entry request indication, actuates the appropriate one of switches 88, 89 to unlock the proper door. As soon as the person opens the unlocked door; pickup 71 is energized to monitor the booth from an overhead view, as described above in connection with FIG. 1, and present on tube 76 a picture of the activity in the booth. As indicated above, this is an important feature of this invention, since it permits the console operator to observe the booth and the conduct of the person entering it from the time the door is opened.

After the person enters the booth and closes the door behind him, the door is locked. The console operator may then initiate the identity examining procedure by switching pickup 71 from the overhead view to the face-examining view by actuating suitable switching which causes mirror 72 to retract to the position shown in dotted lines in FIG. 3. This action would also energize pickup 81. The person 66 then presents the identification card in slot 11*c*, and video pictures of the photograph on this card and the face of the card bearer are simultaneously presented on the faces of tubes 76, 86. The operator examines these pictures, and if satisfied of the correspondence, actuates one of switches 88, 89 to unlock the other door for the departure of the examined person. At this point, the operator preferably switches pickup 71 back to the overhead view condition to monitor the booth during the person's departure to detect any irregularities such as another person entering the booth while the examined person departs, or the leaving of an object in the booth by either the departing person or another person outside the open door.

After the examined person closes the door, this door is locked by the operator actuating the proper switch. The operator continues to monitor the booth contents with the overhead view of pickup 71 after this door locking to insure that no irregularities have occurred. If this monitoring indicates a satisfactory condition in the booth, it is ready to receive another person for examination.

It will be appreciated that the embodiment shown in FIGS. 2-4 offers a great deal more flexibility than that of FIG. 1 in practicing the present invention by virtue of the ability of the human console operator to make decisions based on the information presented to him on tubes 76, 86. The automatic system of FIG. 1 has the advantage of not requiring the expense of human operators for normal operation, but it does not have the ability, with the elements shown in FIG. 1, to handle out-of-the ordinary situations which a human operator can easily accomodate. For example, it is quite probable in many high activity locations that when an examined person opens the booth door to proceed to the other area, a person waiting at that door for admittance to the booth may enter the booth to be examined. This situation would be difficult to accommodate with the system in FIG. 1, because of the relatively simple level of logic provided, but it could easily handled by a human operator at console 77 who could observe the situation through pickup 71 and take the necessary steps to examine the newly admitted person.

However, whether the invention is practiced with a system such as shown in FIG. 1, or with a less automatic system as shown in FIGS. 2–4, it will be seen that the invention provides novel methods and apparatus for controlling the passage of objects and persons from one area to another.

There has been described a method and an apparatus for controlling the passage of persons through a closed space between two areas in which the space is examined prior to admission of persons, after the admission of persons and after the admitted person has departed. Further, the person, after being admitted into the closed spaced, is held there for identification and is only passed through into the other area after having been found acceptable.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims

We claim:

1. The method of controlling the passage of persons between a secured area and an unsecured area through an enclosed space having at least a normally locked door for communicating the space with the secured area and another normally locked door for communicating the space with an unsecured area, comprising the steps of:

unlocking one of said doors in response to a person requesting admittance to said space from one of the areas;

electronically examining substantially the entire contents of said space from a time not later than just prior to the closing of said one door to a time not earlier than just after the locking of said one door to determine the presence in said space of an admitted person and object;

locking said one door, after closing, with the admitted person and object, if any, in said space; and electronically examining at least one characteristic of the person admitted to said space, other than presence and with means other than those used to examine entire contents, to determine the suitability of the examined person to proceed through said space to the other area.

2. The method in accordance with claim 1 including the step of:

unlocking the other door to permit the person and object, if any, in said space to proceed therethrough to the other area if said examined characteristic of the person and said examined contents of said space indicates the person and object, if any, to be suitable to proceed.

3. The method of claim 2 including the additional steps of:

locking said other door after the person and object, if any, in said space have presumably departed or been removed, respectively; and again electronically examining substantially the entire contents of said space prior to admitting another person to the space to determine whether the previously examined person has actually departed therefrom and whether any object has been left in said space.

4. The method of claim 1 including the steps of:

unlocking said one door to permit said person in said space to return through said one door if said examined characteristic of the person indicates unsuitability to proceed.

5. The method in accordance with claim 4 including the steps of:

locking said one door after the person in said space has presumably departed; and again electronically examining substantially the entire contents of said space prior to admitting another person to said space to determine whether the previously examined person has actually departed therefrom and whether any objects were left in said space.

6. The method in accordance with claim 1 in which the electronically examining of the person includes:

simultaneously scanning the face of said person in said space and a photograph on an identification card presented by the person; and comparing the images resulting from said scanning.

7. The method in accordance with claim 6 including the step of:

unlocking said one door to permit said person in said space to return through said one door if said compared images do not correspond.

8. The method in accordance with claim 6 including the step of:

unlocking said other door to permit the person and object in said space to proceed therethrough to the other area if said compared images correspond.

* * * * *